United States Patent Office 3,462,460
Patented Aug. 19, 1969

3,462,460
α-AMINO ACID ANHYDRIDES
Janos Kollonitsch, Westfield, N.J., assignor to Merck & Co., Inc., Rahway, N.J., a corporation of New Jersey
No Drawing. Continuation-in-part of application Ser. No. 361,235, Apr. 20, 1964. This application June 14 1967, Ser. No. 645,866
Int. Cl. C07d 5/06, 7/06; C07c 101/22
U.S. Cl. 260—345.9                                 8 Claims

ABSTRACT OF THE DISCLOSURE

Strong acid salts of aliphatic dicarboxylic amino acids are converted to the cyclic amino acid anhydride salts by treating said salts with a dehydrating agent. The salts of glutamic acid anhydride are novel compounds useful as chemical intermediates.

CROSS-REFERENCES TO RELATED APPLICATIONS

This is a continuation-in-part of our pending application Ser. No. 361,235, filed Apr. 20, 1964 now abandoned.

DESCRIPTION OF THE INVENTION

This application is concerned with aliphatic amino acid anhydrides, salts of aliphatic amino acid anhydrides and a novel method for preparing such compounds.

It is an object of the present invention to provide certain novel salts of cyclic anhydrides of aliphatic carboxylic amino acids.

It is a further object of this invention to provide novel processes for the preparation of cyclic amino acid anhydrides and strong acid salts thereof.

This process makes possible for the first time the preparation of acid salts of glutamic acid anhydride, compounds which have been desired as intermediates for peptide syntheses. Thus, Hanby et al. [J. Chem. Soc. 3239 (1950)] attempted to prepare glutamic acid anhydride by reduction of N-carbobenzyloxy-glutamic acid anhydride but could isolate only 2-ketopyrrolidine-5-carboxylic acid. Kovacs et al. [J. Am. Chem. Soc., 85, 1839 (1963)] sought to obtain the hydrobromide salt of L-glutamic anhydride by treating carbobenzoxy L-glutamic anhydride with hydrogen bromide, but were unable to obtain any of their desired product.

In accordance with the present invention, it has now been found that salts of aliphatic dicarboxylic amino acids are converted to the corresponding cyclic amino acid anhydride in high yield by treatment of the amino acid salts with a dehydrating agent under anhydrous conditions. Thus, a salt of a strong acid and an aliphatic dicarboxylic amino acid is formed by reaction of the amino acid with at least one molar equivalent of a strong acid, whereby the amino acid salt is formed. The salt of the amino acid thus formed is dissolved in a strongly acidic liquid diluent to form a solution of the amino acid salt and the resulting solution is mixed with a dehydrating agent under anhydrous conditions, thereby effecting cyclodehydration of the aliphatic dicarboxylic amino acid to form the salt of the corresponding cyclic aliphatic amino acid anhydride. Thus, in accordance with the present invention, salts of aliphatic dicarboxylic amino acid anhydrides such as the chlorosulfonic acid salt of L-glutamic acid anhydride, the hydrochloric acid salt of L-glutamic acid anhydride, the trifluoroacetic acid salt of L-glutamic acid anhydride, the sulfuric acid salt of L-glutamic acid anhydride, the chlorosulfonic acid salt of L-glutamic acid anhydride, the chlorosulfonic acid salt of L-aspartic acid anhydride, the hydrochloric acid salt of L-aspartic acid anhydride, the trifluoroacetic acid salt of L-aspartic acid anhydride, the sulfuric acid salt of L-aspartic acid anhydride, and the chlorosulfonic acid salt of L-aspartic acid anhydride are prepared from salts of the corresponding aliphatic dicarboxylic amino acids.

The process of this invention requires that the amino acid starting material be present as the salt of a strong acid. The strong acid employed in preparing the amino acid salt may be an organic or inorganic acid and is not limited in type except that it is required that the acid should have a dissociation constant of at least $1.0 \times 10^{-1}$. It is believed that the preparation of a strong acid salt of the amino acid renders the amino group of the amino acid substantially inert under the conditions of the formation of the anhydride and, thus, present undesirable side reactions from occurring. Examples of the strong acids which may be employed include chlorosulfonic acid, fluorosulfonic acid, concentrated sulfuric acid, trifluoroacetic acid, and the halogen acids. In preparing the salt of the aliphatic carboxylic amino acid, it is necessary that the compound and the strong acid employed be intimately mixed in a ratio of at least 1 mole of strong acid per mole of amino acid compound.

Usually, the strong acid employed as a reactant in the preparation of the salt of the amino acid is used as the reaction medium for the dehydration reaction. Thus, in general, it is a desirable feature of the invention to employ a larger amount of the acid than 1 mole of acid per mole of amino acid. In this manner, the acid functions as a solvent for the subsequent dehydration reaction. Such large excesses of the strong acid are not harmful in carrying out the process of this invention.

The amino acid employed in the process of this invention is a lower aliphatic dicarboxylic amino acid. A preferred class of amino acid starting materials are aliphatic dicarboxylic amino acids wherein the carboxylic acid groups are included as the terminal members of an aliphatic carbon chain comprising from 4 to 5 carbon atoms. The aliphatic carbon chain may be substituted at positions intermediate between the carboxylic acid functions with substituents inert to the conditions of the dehydration reaction. Thus, the dicarboxylic amino acids can be substituted with alkyl substituents, e.g., methyl, ethyl, propyl, hexyl and isopropyl; halo substituents, e.g., fluoro, chloro, or bromo; or lower alkoxy substituents as, for example, methoxy, ethoxy, propoxy, isopropoxy or pentoxy substituents. Suitable amino acid starting materials useful in our novel process of preparing amino acid anhydrides are strong acid salts of glutamic or aspartic acids as well as halo, alkyl, and alkoxy derivatives of said acids.

The formation of the amino acid cyclic anhydride is effected by contacting the amino acid salt in a strong acid liquid diluent with at least 1 mole, and preferably a slight molar excess of a dehydrating agent per mole of amino acid salt. The diluent or solvent for the reaction should be inert to the reaction conditions. Thus, an excess of the strong acid employed in preparing the amino acid salt is a satisfactory reaction diluent. In addition, lower aliphatic ethers or mixtures of lower aliphatic ethers with the strong acid, are satisfactory solvents for effecting the dehydration reaction. The dehydrating agent employed is preferably one which is soluble in the reaction medium, chlorides of inorganic oxy acids being especially useful for the purpose of this reaction. Thus, chlorides of oxy acids of sulfur, phosphorus, or carbon are effective in carrying out the dehydration reaction resulting in the cyclization of the amino acid salt to the corresponding amino acid anhydride salt. Examples of inorganic acid chlorides effective in the dehydration reaction are oxalyl chloride, thionyl chloride, phosphorus pentachloride, phosphorus trichloride and phosphorus oxychloride.

The described reaction takes place spontaneously when the individual reactants are intimately mixed under anhydrous conditions. Thus, the reaction takes place immediately under ordinary ambient temperatures, e.g., about 25° C. with the concomitant evolution of gas. Although the temperature of the reaction is not critical in view of the fact that the reaction is effectively carried out at about room temperature, the reaction may be carried out at any convenient temperature between 0° to 100° C. It is critical to the success of the reaction that all of the reactants be substantially free of water and that the reaction be carried out under anhydrous conditions. Small amounts of moisture destroy the reagents and substantially reduce the yield of the desired amino acid anhydride obtained.

After the dehydration reaction is complete, the resulting salt of the amino acid anhydride is recovered using the conventional techniques for the recovery of anhydrides. Thus, if the reaction is carried out in a volatile solvent medium, the product is obtained as a reaction residue when the solvent is removed by evaporation under reduced pressure. In addition, the product may be induced to crystallize from the reaction medium by the addition of materials to decrease the solubility of the product in the reaction medium or by reduction of the temperature. It is essential in the recovery process that moisture be carefully excluded from the product or the reaction mixture. Alternatively, the formed salt of the cyclic amino acid anhydride may be employed as an intermediate in further chemical reactions without isolating the material from the reaction mixture. Thus, the formed amino acid anhydride salt may be reacted with liquid ammonia to yield the amide of the corresponding amino acid.

The amino acid anhydride salts obtained according to the process of the invention are stable and practically colorless compounds which may be used as chemical intermediates. For example, the anhydrides obtained can be converted to the amides of the corresponding aliphatic dicarboxylic amino acids by reaction with liquid ammonia. In this manner, isoglutamine, a known compound, is conveniently synthesized in high yield from glutamic acid. The amino acid anhydride salts can be further treated to provide compounds which are found to have useful properties in enhancing the flavor of foods. Thus, the salt of chlorosulfonic acid and glutamic acid anhydride is converted to γ-chloroglutamic acid anhydride which may be hydrolyzed to the corresponding γ-hydroxy-glutamic acid or alternatively converted by reaction with ammonia to 2,4-diaminoglutaric acid. The previously known aspartic acid anhydride salts have been made readily available by the process of the present invention.

The following examples are presented to illustrate the methods of carrying out the present invention.

EXAMPLE 1

L-glutamic acid anhydride

Ninety-one and eight-tenths grams (0.5 mole) of L-glutamic acid hydrochloride is added with stirring to 175 g. (1.5 mole) of chlorosulfonic acid. After formation of a clear solution comprising the chlorosulfonic acid salt of L-glutamic acid, 71.4 g. (0.6 mole) of thionyl chloride is added. Vigorous gas evolution indicates the reaction taking place. After 2 hours stirring the gas evolution ceases. The colorless oil thus obtained is kept in vacuo to remove the volatile by-products of the reaction. The residue consists of the solution of the chlorosulfonic acid salt of L-glutamic acid anhydride. Its assigned structure is supported by its I.R. spectrum, displaying the characteristic absorption bands of anhydrides at 5.5μ and 5.65μ, respectively.

EXAMPLE 2

Isoglutamine

Twenty grams of the above-obtained solution of glutamic anhydride is added dropwise to 250 ml. of liquid ammonia. After evaporation of the ammonia, the residue is dissolved in water and evaporated in vacuo to free it from ammonia. The solution thus obtained contains isoglutamine along with a small amount of glutamine.

EXAMPLE 3

Chlorosulfonic acid salt of L-glutamic acid anhydride

Fourteen and seven-tenths grams (0.1 mole) of L-glutamic acid is dissolved in 80 ml. of trifluoroacetic acid; 11.7 g. (0.1 mole) of chlorosulfonic acid is added to this solution to form the chlorosulfonic acid salt of L-glutamic acid. To the solution is then added 14.3 g. (0.12 mole) of thionyl chloride. After the gas evolution ceases, the solvent is evaporated in vacuo to furnish a residue consisting of the chlorosulfonic acid salt of L-glutamic acid anhydride in the form of a colorless oil.

EXAMPLE 4

Hydrochloride of L-glutamic acid anhydride

Five grams (.034 mole) of L-glutamic acid is added to a mixture of 40 ml. of trifluoroacetic acid and 40 ml. of thionylchloride. After 15 minutes standing at room temperature the solution is concentrated to about 15 ml. (in vacuo, 25° C.) and 30 ml. of diethyl ether is added, causing the hydrochloride of L-glutamic acid anhydride to crystallize. The product thus isolated is a colorless crystalline compound, M.P. 112° (dec.). Its I.R. spectrum (solid state in Nujol) contains the characteristic absorption peaks of an aliphatic anhydride (at 5.53μ and 5.65μ, respectively).

Analysis.—Calculated for $C_5H_8NO_3Cl$: C, 36.3; H, 4.87; N, 8.4. Found: C, 35.8; H, 4.7; N, 7.9%.

EXAMPLE 5

Sulfuric acid salt of L-glutamic acid anhydride

Eighteen and three-tenths grams (0.1 mole) of L-glutamic acid hydrochloride is dissolved in 29 g. (0.3 mole) of 100% sulfuric acid to form a solution of the sulfuric acid salt of L-glutamic acid in sulfuric acid. To the resulting solution is then added 9.4 ml. (14 g.; 0.11 mole) of oxalyl chloride. The mixture is stirred overnight at room temperature. After degassing in vacuo a colorless crystal-slurry is obtained, comprising the sulfuric acid salt of L-glutamic acid anhydride. This crystalline product is then filtered with the exclusion of moisture and washed with ether.

EXAMPLE 6

Chlorosulfonic acid salt of aspartic acid anhydride

Thirty-three and three-tenths grams (0.25 mole) of L-aspartic acid is dissolved in 87.5 g. (0.75 mole) of chlorosulfonic acid to form the chlorosulfonic acid salt of aspartic acid. To the solution is added 35.7 g. (0.30 mole) of thionylchloride. After the gas evolution ceases, the solution is stirred in vacuo for about 1 hour, to remove the unreacted (excess) thionylchloride. A practically colorless oil remains, consisting of the chlorosulfonic acid salt of aspartic acid anhydride, dissolved in the excess chlorosulfonic acid.

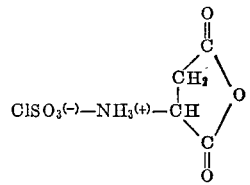

EXAMPLE 7

The hydrobromide of L-aspartic acid anhydride

Two grams of L-aspartic acid is dissolved in a mixture of 30 ml. of trifluoroacetic acid and 10 ml. of thionylchloride. After standing for 10 minutes at room temperature, it is concentrated in vacuo to a syrup. This is then dissolved in 30 ml. of acetic anhydride, HBr gas is passed in the cold. The hydrobromide of the anhydride of L-aspartic acid crystallizes out. It is filtered, washed with acetic anhydride.

It is to be understood that various changes and modifications of the invention can be made to the extent that such variations incorporate the spirit of this invention.

What is claimed is:

1. The process which comprises contacting a solution of L-glutamic acid in trifluoroacetic acid with about an equal molar amount of chlorosulfonic acid based on the glutamic acid present to form the chlorosulfonic acid salt of L-glutamic acid and subsequently contacting the resulting solution of the said salt with a slightly molar excess of thionyl chloride based on the amount of L-glutamic acid to form the chlorosulfonic acid salt of L-glutamic acid anhydride.

2. The process which comprises intimately mixing L-glutamic acid with a solution of a molar excess of thionyl chloride based on the amount of L-glutamic acid dissolved in trifluoroacetic acid to produce the hydrochloride of L-glutamic acid anhydride and recovering said hydrochloride.

3. The process which comprises contacting a solution of L-glutamic acid hydrochloride in 100% sulfuric acid with a slight molar excess of thionyl chloride based on the amount of L-glutamic acid hydrochloride of oxalyl chloride to produce the sulfuric acid salt of L-glutamic acid anhydride.

4. The process which comprises contacting a solution of L-aspartic acid in trifluoroacetic acid with a molar excess of thionyl chloride based on the amount of L-aspartic acid to produce the hydrochloride of L-aspartic acid anhydride and recovering said hydrochloric acid salt.

5. A salt of a strong acid having a dissociation constant of at least $1.0 \times 10^{-1}$ and glutamic acid anhydride.

6. The compound of claim 5 which is the chlorosulfonic acid salt of L-glutamic acid anhydride.

7. The compound of claim 5 which is the hydrochloride salt of L-glutamic acid anhydride.

8. The compound of claim 5 which is the sulfate salt of L-glutamic acid anhydride.

References Cited

Hickenbottom, Reactions of Organic Compounds, pp. 226–227 (1948).

H. Meyer, Synthese der Kohlenstoffverbindungen, Zweiter Teil, 1. Halfte (1940), pp. 179–188.

Chem. Abstracts, vol. 60, March 1964, p. 5629.

Chem. Abstracts, vol. 51, p. 17752e.

NORMA S. MILESTONE, Primary Examiner

U.S. Cl. X.R.

260—346.8, 501.11, 501.12, 534, 561